United States Patent
Yun et al.

(10) Patent No.: US 9,946,384 B2
(45) Date of Patent: Apr. 17, 2018

(54) METHOD OF CONTROLLING TOUCH PANEL

(71) Applicant: SOLOMON SYSTECH LIMITED, Hong Kong (CN)

(72) Inventors: Il Hyun Yun, Daejeon (KR); Hyong Cheol Shin, Daejeon (KR); Young Kook Kim, Daejeon (KR)

(73) Assignee: SOLOMON SYSTECH LIMITED, Hong Kong (CN)

( * ) Notice: Subject to any disclaimer, the term of this patent is extended or adjusted under 35 U.S.C. 154(b) by 0 days.

(21) Appl. No.: 15/190,275

(22) Filed: Jun. 23, 2016

(65) Prior Publication Data

US 2017/0003824 A1    Jan. 5, 2017

(30) Foreign Application Priority Data

Jul. 3, 2015 (KR) .......................... 10-2015-0095543

(51) Int. Cl.
*G06F 3/041* (2006.01)
*G06F 1/32* (2006.01)
*G06F 3/044* (2006.01)

(52) U.S. Cl.
CPC .......... *G06F 3/0412* (2013.01); *G06F 1/3262* (2013.01); *G06F 3/0416* (2013.01); *G06F 3/044* (2013.01)

(58) Field of Classification Search
None
See application file for complete search history.

(56) References Cited

FOREIGN PATENT DOCUMENTS

| KR | 1020090107049 A | 11/2009 |
|---|---|---|
| KR | 1020140144651 A | 12/2014 |

OTHER PUBLICATIONS

Notice of Allowance of KR1020150095543 dated Nov. 18, 2016, 1 page.
English Notice of Allowance of KR1020150095543 dated Nov. 18, 2016, 2 pages.
Notice of Preliminary Rejection of KR1020150095543 dated Jun. 10, 2016, 4 page.
English Notice of Preliminary Rejection of KR1020150095543 dated Jun. 10, 2016, 4 pages.

*Primary Examiner* — Brian Butcher
(74) *Attorney, Agent, or Firm* — Rankin, Hill & Clark LLP (57) ABSTRACT

A method of controlling a touch screen which includes electrode pads provided in response to a display is provided, the method includes: performing a pre-scan of scanning the electrode pads under a deactivation mode of the display; confirming a first touch input during the pre-scan; performing a high-speed fine scan of scanning the electrode pads with a fine high frequency that is higher than a frequency for the pre-scan; evaluating a touch validity of the first touch input of the pre-scan via the high-speed fine scan; performing a fine scan of scanning the electrode pads that is higher than the frequency for the pre-scan and lower than the frequency of the high-speed fine scan, when the touch validity of the first touch input is satisfied; sensing a second touch input during the fine scan; and changing the display into an activation mode in response to the second touch input.

12 Claims, 6 Drawing Sheets

METHOD OF CONTROLLING TOUCH PANEL

FIELD OF THE INVENTION

The present invention relates to a method of controlling a touch panel, and more particularly to a method of controlling a touch panel, which is capable of reducing power consumption and improving response speed and accuracy of external touch.

BACKGROUND OF THE INVENTION

Generally, a personal digital assistant (PDA) has a touch panel such as a touch screen or a touch electrode pad installed therein, due to better use of a space and use convenience.

A touch panel may be broadly divided into a capacitive overlay type, a resistive overlay type, an infrared beam type, a surface acoustic wave type, etc. Recently, a capacitive overlay type touch panel has come into the spotlight.

Recently, according to the needs of consumers, various attempts to integrate a touch sensor have been made in order to realize a slim, lightweight and bezel-less touch panel. For reference, a method of integrating a touch sensor may be roughly divided into an in-cell method and an on-cell method according to an object (a display panel or cover glass) with which the touch sensor is integrated. As one in-cell method, advanced in-cell touch (AIT) technology refers to touch technology of installing a touch sensor in a liquid crystal display (LCD) cell, can provide superior touch sensitivity, and can decrease a panel thickness and a bezel width to implement slimness. Therefore, this technology has been widely used.

Recently, technology of sensing touch input even in a state in which a display is in a deactivation mode (sleep mode) to control the function of a terminal was proposed according to the needs for a new user interface.

However, in order to sense touch input in a state in which the display is in the deactivation mode, the touch panel is continuously scanned to confirm external touch even in the deactivation state of the display. Accordingly, the internal computational burden of a touch controller increases and a response speed decreases, thereby increasing power consumption.

Therefore, recently, various researches into reducing power consumption and improving response speed and accuracy of external touch have been conducted, but results have been insufficient, and thus development thereof is required.

SUMMARY OF THE INVENTION

The present invention provides a method of controlling a touch panel, which is capable of reducing power consumption and improving response speed and accuracy of external touch.

In particular, the present invention provides a method of controlling a touch panel, which is capable of sensing external touch input by scanning an electrode pad under different scan conditions in a state in which a display is in a deactivation mode and accurately determining validity of first external touch input.

The present invention provides a method of controlling a touch panel, which is capable of preventing deterioration in touch sensitivity and improving user convenience.

The present invention provides a method of controlling a touch panel, which is capable of reducing noise and preventing malfunction.

Solutions for the problems: in accordance with the preferred embodiments of the present invention for achieving the objects of the present invention, a method of controlling a touch panel having a plurality of electrode pads provided in correspondence with a display includes performing a pre-scan for scanning the electrode pads in a deactivation mode of a display, confirming external touch input during the pre-scan, performing a high-speed fine scan for scanning the electrode pads at a high speed with a frequency higher than that of the pre-scan when external touch input is sensed during the pre-scan, determining whether external touch input sensed during the pre-scan is valid during the high-speed fine scan, performing a fine scan for scanning the electrode pads with a frequency higher than that of the pre-scan and lower than that of the high-speed fine scan when it is determined that external touch input sensed during the pre-scan is valid, and sensing another external touch input during the fine scan, and switching the display to an activation mode when another external touch input is sensed during the fine scan.

For reference, a touch sensor of the touch panel according to the present invention may be provided using an in-cell method, an on-cell method, or an add-on method of attaching the touch sensor to an outer surface (or an inner surface) of a cover glass. The present invention is not limited or restricted by the method of providing the touch sensor.

In the present invention, the deactivation mode of the display is also referred to as a sleep mode and means that operation of the main central processing unit (CPU) of a terminal is stopped, that is, operations of various application programs are stopped and the display is turned off. In contrast, the activation mode of the display means that operation of the main CPU of the terminal is activated, that is, the display is turned on or various application programs are executed.

The pre-scan may be performed by scanning the electrode pads with a predetermined frequency. Preferably, the pre-scan may be performed so as to prevent increase in power consumption and computational burden in the deactivation mode of the display or minimize increase in power consumption and computational burden upon noise occurrence. For example, in the pre-scan, the electrode pads may be scanned with a frequency lower than that during the normal scan (the scan process in the activation mode).

In the step of determining whether external touch input sensed during the pre-scan is valid during the high-speed fine scan, determining whether external touch input is valid may include determining whether the signal sensed by external touch input is intended touch or noise due to unintended touch.

In the step of determining whether external touch input sensed during the pre-scan is valid during the high-speed fine scan, whether external touch input sensed during the pre-scan satisfies a predetermined condition may be determined.

The predetermined condition of external touch input sensed during the pre-scan may appropriately change according to requirements and design specifications. For example, the predetermined condition of external touch input sensed during the pre-scan may include whether a holding time of external touch input sensed during the pre-scan satisfies a predetermined time. In some cases, the predetermined condition of external touch input sensed during the pre-scan may include a count of external touch inputs, a touch pattern, a touch code, etc.

Even in the step of sensing another external touch input during the fine scan, whether another external touch input satisfies the predetermined condition during the fine scan may be determined. When it is determined that another external touch input satisfies the predetermined condition during the fine scan, it may be determined that another external touch input is sensed during the fine scan. For example, the predetermined condition of another external touch input during the fine scan may include a condition regarding whether the holding time of second external touch input (another external touch input) during the fine scan satisfies a predetermined time and a start time condition regarding whether second external touch input (external touch input sensed during the fine scan) starts within a predetermined time after first external touch input (external touch input sensed during the pre-scan). In some cases, the predetermined condition of another external touch input during the fine scan may include a count of external touch inputs and another condition, a specific touch pattern or a touch code.

After the display is switched to the activation mode, the normal scan may be performed with respect to the electrode pads with a frequency different from that of the pre-scan. When external touch input is not sensed during the pre-scan, the pre-scan may be continuously performed. In addition, if external touch input is not sensed during a predetermined time even while the fine scan is performed in the deactivation mode of the display, the pre-scan may be performed again.

As the number of scanned objects decreases, it is possible to decrease computational burden and power consumption. Adjacent electrode pads of the plurality of electrode pads configuring the touch sensor of the touch panel are grouped to form a plurality of electrode groups. At least one of the pre-scan, the high-speed fine scan and the fine scan may be performed by scanning the electrode groups and the plurality of electrode pads included in a specific electrode group may be electrically connected to each other and regarded as one electrode upon the pre-scan and the high-speed fine scan.

At least one of the pre-scan, the high-speed fine scan and the fine scan may include a group scan for scanning an electrode group and an individual scan for individually scanning electrode pads. The individual scan may be periodically or intermittently performed and the period of the individual scan may appropriately change according to requirements and design specifications. Preferably, the individual scan may be performed at a period relatively longer than that of the group scan.

Effects of the invention: According to the method of controlling the touch panel of the present invention, it is possible to reduce power consumption and improve response speed and accuracy of external touch.

In particular, according to the present invention, electrode pads are scanned in a low power mode in a deactivation mode of a display. After first external touch input is sensed, the electrode pads are scanned under a very-high-speed scan condition to determine whether external touch input is valid. Then, when another external touch input is sensed under another low-power scan condition, the mode of the display is switched. Therefore, it is possible to minimize power consumption and improve response speed and accuracy of external touch. According to the present invention, since the validity of first external touch input is verified by the pre-scan and the high-speed fine scan, it is possible to more accurately determine whether first external touch input is valid.

According to the present invention, adjacent electrode pads of the plurality of electrode pads are grouped to form a plurality of electrode groups and at least one of the pre-scan, the high-speed fine scan and the fine scan may be performed by scanning the electrode group, thereby decreasing power consumption and reducing a scan time.

Further, upon the pre-scan, the high-speed fine scan and the fine scan, the group scans for scanning the electrode group and the individual scan for individually scanning the electrode pads may be alternately performed, thereby preventing malfunction due to sudden signal change.

In addition, according to the present invention, it is possible to prevent touch sensitivity deterioration and to improve user convenience.

DETAILED DESCRIPTION OF THE PREFERRED EMBODIMENT

Hereinafter, the embodiments of the present invention will be described in detail with reference to the accompanying drawings, but the present invention is not limited to the embodiments described herein. For reference, in this description, the same reference numerals denote substantially the same elements and portions well-known to those skilled in the art or repeated portions will be omitted.

Figure 1:
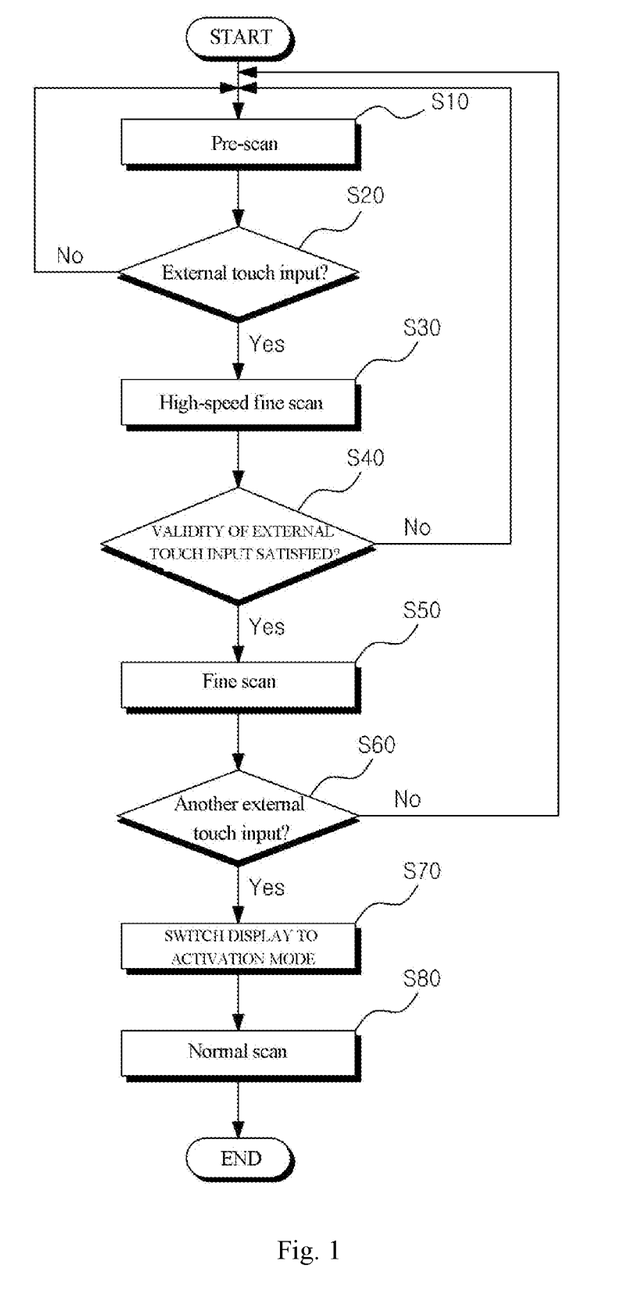
FIG. 1 is a block diagram illustrating a method of controlling a touch panel according to the present invention.
Figure 2:
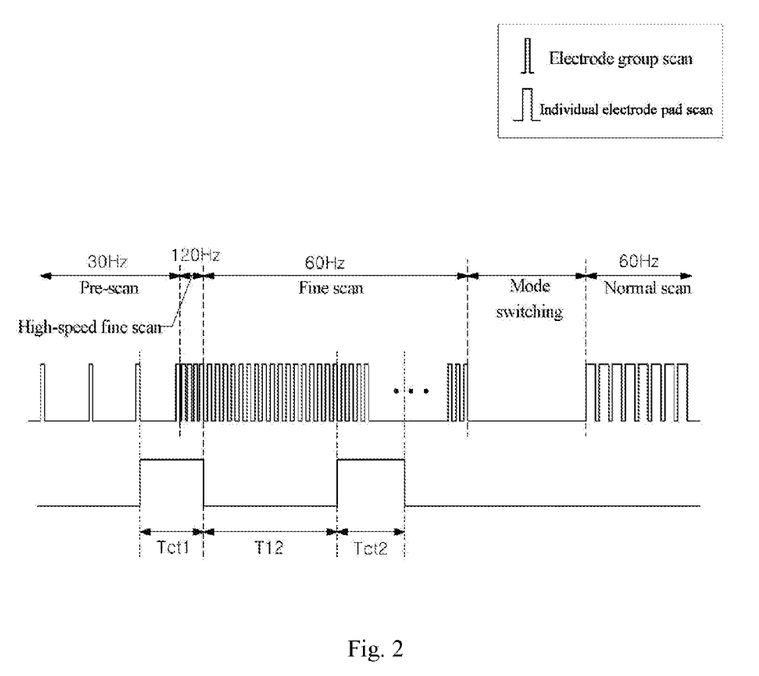
FIG. 2 is a diagram illustrating a method of controlling a touch panel according to the present invention.
Figure 3:
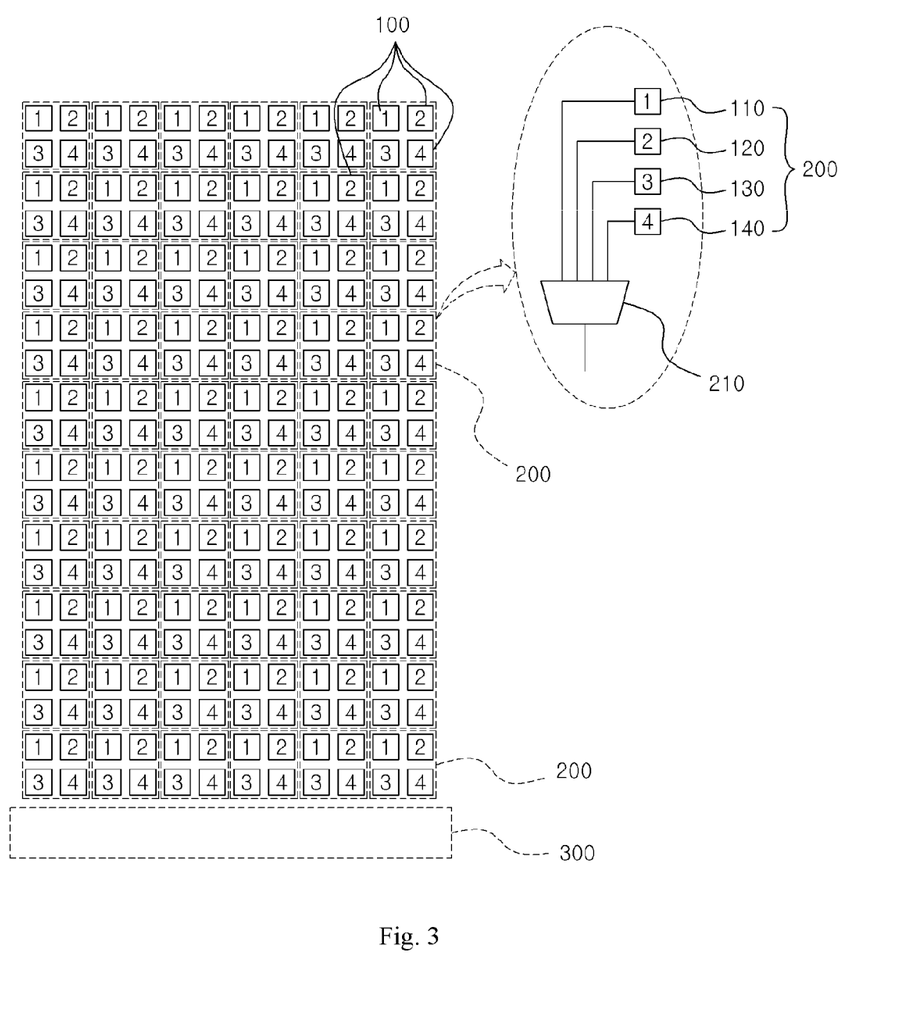
FIGS. 3 to 5 are diagrams illustrating a method of controlling a touch panel according to the present invention, which illustrate an electrode pad and an electrode group.
Figure 4:
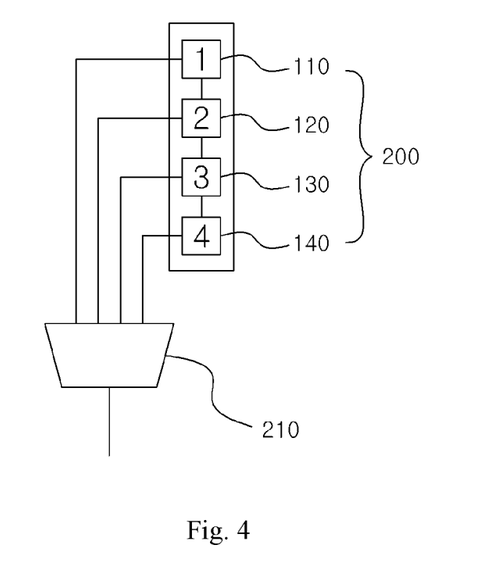
Figure 5:
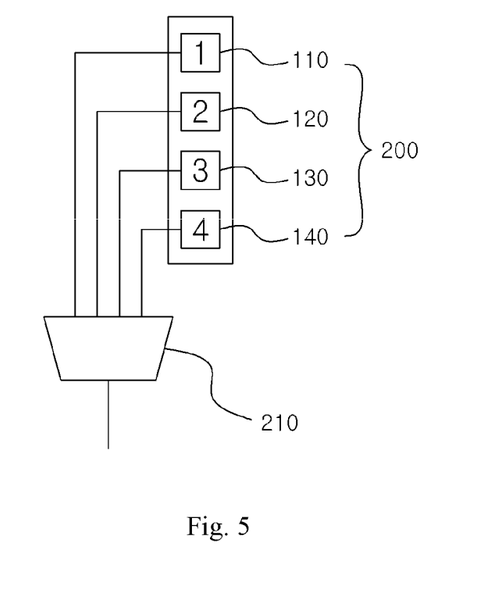

FIG. 1 is a block diagram illustrating a method of controlling a touch panel according to the present invention; FIG. 2 is a diagram illustrating a method of controlling a touch panel according to the present invention, and FIGS. 3 to 5 are diagrams illustrating a method of controlling a touch panel according to the present invention, which illustrate an electrode pad and an electrode group.

As shown in FIGS. 1 and 2, the method of controlling the touch panel according to the present invention includes step S10 of performing a pre-scan for scanning electrode pads in a deactivation mode of a display, step S20 of confirming external touch input during the pre-scan, step S30 of performing a high-speed fine scan for scanning the electrode pads at a high speed with a frequency higher than that of the pre-scan when external touch input is sensed during the pre-scan, step S40 of determining whether external touch input sensed during the pre-scan is valid during the high-speed fine scan, step S50 of performing a fine scan for scanning the electrode pads with a frequency higher than that of the pre-scan and lower than that of the high-speed fine scan when it is determined that external touch input sensed during the pre-scan is valid, step S60 of sensing another external touch input during the fine scan, and step S70 of switching the display to an activation mode when another external touch input is sensed during the fine scan.

For reference, the touch sensor of the touch panel according to the present invention may be provided using an in-cell method, an on-cell method, or an add-on method of attaching the touch sensor to an outer surface (or an inner surface) of a cover glass. The present invention is not limited or restricted by the method of providing the touch sensor.

Hereinafter, for example, assume that the touch sensor of the touch panel according to the present invention is of an in-cell type. In general, in the in-cell type touch sensor, electrode pads 100 and control lines among the components of the display may be commonly used. The control line may be any one of a gate line and a data line (not shown) for an image pixel. In addition, the image pixel means one RGB pixel, that is, one pixel unit. Data lines and gate lines for "R", "G" and "B" may be provided to each image pixel.

The present invention is configured to sense touch input even in a deactivation state of a display to control the function of a terminal For reference, a plurality of electrode pads 100 of the touch sensor may be provided in correspondence with the display. The plurality of electrode pads 100 may be connected to a touch sensing circuit 300 by an electrode pad wire (not shown).

First, a pre-scan process for scanning the electrode pads 100 in the deactivation mode of the display is performed.

Here, the deactivation mode of the display is also referred to as a sleep mode and means that operation of the main central processing unit (CPU) of a terminal is stopped, that is, operations of various application programs are stopped and the display is turned off.

The pre-scan may be performed by scanning the electrode pads 100 with a predetermined frequency. Preferably, the pre-scan may be performed so as to prevent increase in power consumption and computational burden in the deactivation mode of the display or minimize increase in power consumption and computational burden upon noise occurrence. For example, in the pre-scan, the electrode pads 100 may be scanned with a frequency lower than that of a normal scan (a scan process in an activation mode). Hereinafter, assume that the pre-scan is performed with a frequency of 30 Hz.

Next, external touch input is confirmed during the pre-scan.

External touch input may be confirmed by measuring change in an electrical characteristic value (e.g., capacitance) as a touch object approaches the electrode pads 100 during the pre-scan. For reference, external touch input during the pre-scan may include not only intended touch input of a user for manipulating the terminal but also unintended touch input. In addition, unintended touch input may include a user body contacting the touch panel independently of manipulation of the terminal, a conductive material in a bag or handbag contacting the touch panel or occurrence of contact with the touch panel upon gripping of the terminal Next, when external touch input is sensed during the pre-scan, a high-speed fine scan for scanning the electrode pads 100 under the condition different from that of the pre-scan is performed in order to acquire external touch input validity higher than that of the pre-scan. More specifically, when external touch input is sensed during the pre-scan, the high-speed fine scan for scanning the electrode pads 100 at a high speed with a frequency higher than that of the pre-scan is performed.

In the high-speed fine scan, the electrode pads 100 are scanned at the high speed with a very high frequency, thereby more accurately determining validity of first external touch input (external touch input sensed during the pre-scan). For example, in the high-speed fine scan, the electrode pads 100 may be scanned with a frequency of 120 Hz.

Next, the validity of external touch input sensed during the pre-scan is determined during the high-speed fine scan.

For reference, in the present invention, determining validity of external touch input includes determining whether the signal sensed by external touch input is intended touch or noise due to unintended touch.

The high-speed fine scan may be temporarily performed as first external touch input is sensed during a low-speed scan (pre-scan). When first external touch input is sensed during the pre-scan, the electrode pads are scanned with a higher frequency to accurately determine validity of first external touch input, that is, whether first external touch input is noise (e.g., touch occurring independently of manipulation of the terminal) or normal touch input for manipulating the terminal.

In the pre-scan, since the electrode pads are scanned with the low frequency, power consumption is low, but the low-speed scan is not sufficient to accurately determine validity of very short or special touch input. In contrast, in the high-speed fine scan, since the electrode pads are scanned at a high speed with a very high frequency, power consumption is high. However, since more data regarding specific touch input can be acquired during a short time, it is possible to more rapidly and accurately determine validity of specific touch input.

In the step of determining validity of external touch input sensed during the pre-scan during the high-speed fine scan, whether external touch input sensed during the pre-scan satisfies a predetermined condition may be determined.

That is, in the step of determining validity of external touch input sensed during the pre-scan in order to minimize malfunction due to noise, whether external touch input sensed during the pre-scan satisfies the predetermined condition may be determined. When it is determined that external touch input sensed during the pre-scan satisfies the predetermined condition, it may be determined that external touch input sensed during the pre-scan is valid.

The predetermined condition of external touch input sensed during the pre-scan may appropriately change according to requirements and design specifications. For example, the predetermined condition may include a condition Tct1 regarding whether a holding time of external touch input sensed during the pre-scan satisfies a predetermined time. The holding time condition Tct1 of external touch input sensed during the pre-scan may be in a range from a shortest time to a longest time. The shortest time may be set to a scan time (1 ms)+one period of the high-speed fine scan (8 ms)=9 ms and the longest time may be set to one period of the pre-scan (33 ms)+one period of the high-speed fine scan (8 ms)=41 ms. In some cases, the predetermined condition of external touch input sensed during the pre-scan may include a count of external touch inputs, a touch pattern, a touch code, etc.

According to the predetermined condition of external touch input sensed during the pre-scan, it may determined that, for example, short external touch input occurring independently of manipulation of the terminal or long external touch input upon gripping of the terminal independently of manipulation of the terminal is not valid.

Next, when validity of external touch input during the pre-scan is determined, a fine scan for scanning the electrode pads 100 with a frequency higher than that of the pre-scan and lower than that of the high-speed fine scan is performed.

The fine scan refers to a process of scanning the electrode pads 100 in order to sense subsequent external touch input after the validity of external touch input sensed during the pre-scan is determined. The fine scan may be variously performed with a frequency higher than that of the pre-scan and lower than that of the high-speed fine scan according to requirements and design specifications. For example, the fine scan may be performed with a frequency of 60 Hz.

For reference, a time when the high-speed fine scan is switched to the fine scan may appropriately change according to requirements and design specifications.

For example, the validity of first sensed external touch input may be determined and, at the same time, the scan condition of the electrode pads may be switched from the high-speed fine scan to the fine scan. In some cases, even when the validity of first sensed external touch input is determined, if a predetermined high-speed fine scan period (a period of time when the high-speed fine scan is performed) remains, the scan condition of the electrode pads may be switched from the high-speed fine scan to the fine scan after the predetermined high-speed fine scan period has finished.

For reference, although the example in which the frequency condition of the high-speed fine scan is set to be different from that of the pre-scan to increase validity of external touch input is described in the embodiments of the present invention, the high-speed fine scan may be performed using a method other than the method of controlling the frequency if the validity of external touch input can increase.

Next, another external touch input is sensed during the fine scan.

Another external touch input during the fine scan may be sensed by measuring an electrical characteristic value (e.g., capacitance) via the electrode pad 100 during the fine scan.

In addition, even in the step of sensing another external touch input during the fine scan, whether another external touch input during the fine scan satisfies a predetermined condition may be determined. If it is determined that another external touch input during the fine scan satisfies the predetermined condition, it may be determined that another external touch input is sensed during the fine scan.

The predetermined condition of another external touch input during the fine scan may appropriately change according to requirements and design specifications. For example, the predetermined condition of another external touch input during the fine scan may include a condition Tct2 regarding whether a holding time of second external touch input (another external touch input) performed during the fine scan satisfies a predetermined time. The holding time condition Tct2 of second external touch input performed during the fine scan may be in a range from a shortest time to a longest time. The shortest time may be set to one period of the high-speed fine scan (8 ms)+a scan time (1 ms)=9 ms and the longest time may be set to two periods of the high-speed fine scan (8 ms*2)=16 ms.

In addition, the predetermined condition of another external touch input performed during the fine scan may include a start time condition T12 regarding whether second external touch input (external touch input sensed during the fine scan) starts within a predetermined time after first external touch input (external touch input sensed during the pre-scan).

The start time condition T12 between first external touch input (external touch input sensed during the pre-scan) and second external touch input (external touch input sensed during the fine scan) may appropriately change according to requirements and design specifications. For example, the start time condition T12 may be greater than the scan time (1 ms) and less than one period (8 ms) of the high-speed fine scan (1 ms<start time condition T12<8 ms).

Although the example in which the predetermined condition of another external touch input during the high-speed fine scan includes a time condition is described in the above-described embodiment of the present invention, in some cases, the predetermined condition of another external touch input may include a count of external touch inputs and other conditions. In the step of determining whether another external touch input satisfies the predetermined condition during the high-speed fine scan, input of a specific touch pattern or touch code may be sensed.

Next, when external touch input is sensed during the fine scan, the display may be switched to the activation mode.

Here, the activation mode of the display means that operation of the main CPU of the terminal is activated, that is, the display is turned on or various application programs are executed. For example, when the display is switched to the activation mode, a lock mode may be released and, at the same time, a specific application program may be executed. In some cases, when the display is switched to the activation mode, a lock mode release screen may be displayed.

Next, after the display is switched to the activation mode, a normal scan may be performed with respect to the electrode pads 100 with a frequency different from that of the pre-scan (see S80 of FIG. 1).

The normal scan refers to a scan process of sensing external touch input in the activation mode of the display. In the normal scan, the electrode pads 100 may be scanned under the scan conditions as in the normal activation mode. For example, the normal scan may be performed with a frequency of 60 Hz or 120 Hz.

In addition, when external touch input is not sensed during the pre-scan, the pre-scan may be continuously performed. In addition, even while the fine scan is performed in the deactivation mode of the display, if another external touch input is not sensed during a predetermined time, the pre-scan may be performed again.

When the electrode pads 100 are individually scanned, computational burden and power consumption may increase in proportion to increase in the number of electrode pads 100. If the electrode pads 100 are provided in the form of a 20*12 matrix, 240 electrode pads 100 are individually scanned, thereby increasing computational burden and power consumption. However, when adjacent electrode pads 100 are grouped and scanned, the number of scanned objects can be reduced, thereby decreasing computational burden and power consumption.

Referring to FIGS. 3 to 5, adjacent electrode pads 100 of the plurality of electrode pads 100 configuring the touch sensor of the touch panel are grouped to form a plurality of electrode groups 200. For example, 240 electrode pads provided in the form of a 20*12 matrix may be grouped four by four to form a total of 60 electrode groups 200.

Switches may be provided between the plurality of electrode pads 100 included in a specific electrode group 200 and the plurality of electrode pads 100 included in the specific electrode group 200 may be electrically connected to or disconnected from each other via the switches.

When the plurality of electrode pads 100 included in the specific electrode group 200 is electrically connected, the specific electrode group 200 may be recognized as one electrode and a total of 6*10=60 electrode groups 200 are scanned to sense touch input. Unlike the method of scanning 240 electrode pads, since only 60 electrode groups 200 are scanned, it is possible to reduce computational burden and power consumption.

In particular, the pre-scan, the high-speed fine scan and the fine scan are performed in order to sense touch input in the deactivation mode of the display. Therefore, it is not necessary to accurately sense a touch input position. Accordingly, at least one of the pre-scan, the high-speed fine scan and the fine scan may be performed by scanning the electrode group 200. Upon the pre-scan, the high-speed fine scan and the fine scan, the plurality of electrode pads 100 included in the specific electrode group 200 may be electrically connected to each other and may be regarded as one electrode.

For reference, when the plurality of electrode pads 110 to 140 is electrically connected to each other (see FIG. 4), the electrode group 200 is regarded as one electrode. Accordingly, when the scan process is performed with respect to the electrode group 200, it is possible to obtain only an approximate touch input position corresponding to the area of the specific electrode group 200, but it is difficult to accurately obtain a touch input position, that is, via which of the electrode pads 110 to 140 included in the specific electrode group 200 touch input is received.

Although the example of performing the pre-scan, the high-speed fine scan and the fine scan by scanning the electrode group 200 is described in the embodiment of the present invention, in some cases, only one of the pre-scan, the high-speed fine scan and the fine scan may be performed by scanning the electrode group.

In the pre-scan, the high-speed fine scan and the fine scan, since 240 electrode pads are not individually scanned but only 60 electrode groups 200 are scanned, it is possible to reduce computational burden and power consumption.

In contrast, after the display is switched to the activation mode, since the touch input position needs to be accurately obtained, the normal scan may be performed by individually scanning the electrode pads 100 instead of the electrode groups 200. When the plurality of electrode pads 100 are individually scanned, electrical connection between the electrode pads 110 to 140 included in the specific electrode group 200 may be interrupted (see FIG. 5) and a multiplexer 210 provided to each electrode group 200 may selectively connect any one of the four electrode pads 110 to 140 belonging to the specific electrode group 200 to an output line.

Figure 6:
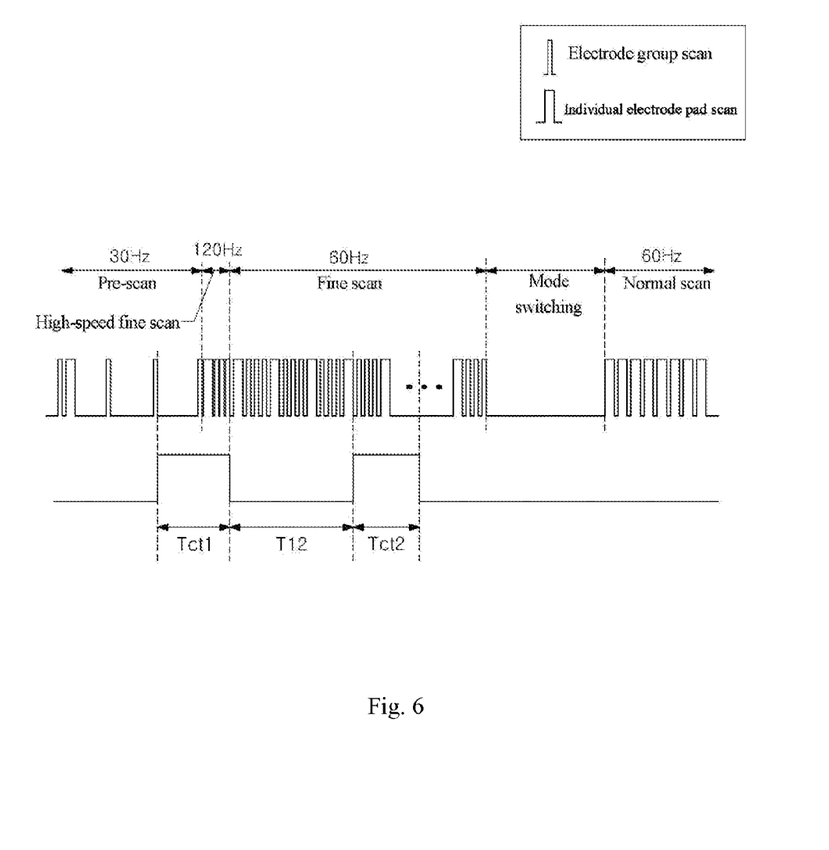
FIGS. 6 and 7 are diagrams illustrating a method of controlling a touch panel according to another embodiment of the present invention.
Figure 7:
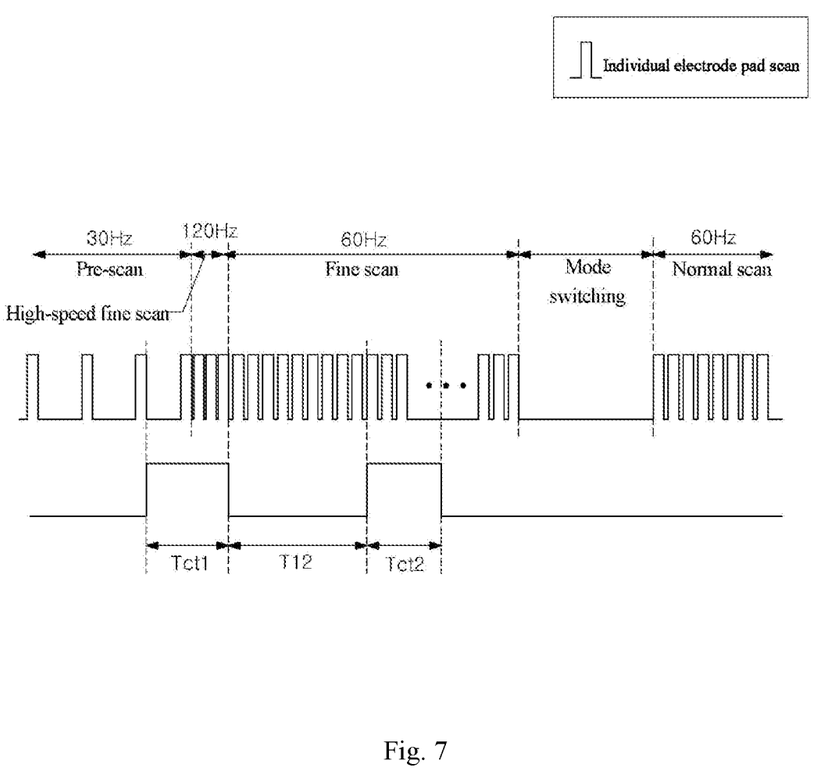

FIGS. 6 and 7 are diagrams illustrating a method of controlling a touch panel according to another embodiment of the present invention. The components similar or equal to the above-described embodiment are denoted by the same or similar reference numerals and a detailed description thereof will be omitted.

Referring to FIG. 6, any one of the pre-scan, the high-speed fine scan and the fine scan may include a group scan for scanning the electrode group 200 and an individual scan for individually scanning the electrode pad 100.

As described above, the normal scan is performed by individually scanning the electrode pads 100 instead of the electrode group 200. However, if touch input is sensed by the touch input signal of the electrode group 200 (in the deactivation mode) and then touch input is sensed by the touch input signal of the individual electrode pad 200 (in the activation mode), malfunction may occur by a sudden signal change (group signal->individual signal).

In the present invention, the pre-scan, the high-speed scan and the fine scan are performed via the group scan for scanning the electrode group 200, and the individual scan for individually scanning the electrode pads 100 is additionally performed while performing the pre-scan, the high-speed fine scan and the fine scan to alternately inputting different signals, thereby minimizing malfunction due to a sudden signal change.

The individual scan may be periodically or intermittently performed and the period of the individual scan may appropriately change according to requirements and design specification. Preferably, the individual scan having power consumption higher than that of the group scan may be performed at a period relatively longer than that of the group scan.

Even when both group scan and individual scan are performed, whether first external touch input and another external touch input satisfy the predetermined condition may be determined. When the predetermined condition is satisfied, it may be determined that external touch input is performed.

For example, referring to FIG. 6, the holding time condition Tct1 of first external touch input sensed during the pre-scan is in a range from a shortest time to a longest time. The shortest time may be set to scan time (1 ms)+one period of the high-speed fine scan (8 ms)+scan time (1 ms)=10 ms and the longest time may be set to one period of the pre-scan (33 ms)+one period of the high-speed fine scan (8 ms)+scan time (1 ms)=42 ms.

In addition, the holding time condition Tct2 of second external touch input sensed during the fine scan is in a range from a shortest time to a longest time. The shortest time may be set to one period of the high-speed fine scan (8 ms)+scan time (1 ms)=9 ms and the longest time may be set to two periods of the high-speed fine scan (8 ms*2)=16 ms.

The start time condition T12 between first external touch input (external touch input sensed during the pre-scan) and second external touch input (external touch input during the fine scan) may be greater than the scan time (1 ms) and less than one period (8 ms) of the high-speed fine scan (1 ms<start time condition T12<8 ms).

Referring to FIG. 7, the method of controlling the touch panel according to another embodiment of the present invention includes performing a pre-scan for scanning the electrode pads 100 in a deactivation mode of a display, confirming external touch input during the pre-scan, performing a high-speed fine scan for scanning the electrode pads 100 at a high speed with a frequency higher than that of the pre-scan when external touch input is sensed during the pre-scan, determining whether external touch input sensed during the pre-scan is valid during the high-speed fine scan, performing a fine scan for scanning the electrode pads 100 with a frequency higher than that of the pre-scan and lower than that of the high-speed fine scan when it is determined that external touch input sensed during the pre-scan is valid, sensing another external touch input during the fine scan, and switching the display to an activation mode when another external touch input is sensed during the fine scan. The pre-scan, the high-speed fine scan and the fine scan are performed via the individual scan for individually scanning the plurality of electrode pads 100.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

DESCRIPTION OF REFERENCE NUMERALS

100: electrode pad
200: electrode group

210: multiplexer
300: touch sensing circuit

What is claimed is:

1. A method of controlling a touch screen which includes electrode pads provided in response to a display, the method comprising steps of:
    performing a pre-scan of scanning the electrode pads under a deactivation mode of the display;
    confirming a first touch input during the pre-scan;
    performing a high-speed fine scan of scanning the electrode pads with a fine high frequency that is higher than a frequency for the pre-scan;
    evaluating a touch validity of the first touch input of the pre-scan via the high-speed fine scan;
    performing a fine scan of scanning the electrode pads that is higher than the frequency for the pre-scan and lower than the frequency of the high-speed fine scan, when the touch validity of the first touch input is satisfied;
    sensing a second touch input during the fine scan; and
    changing the display into an activation mode in response to the second touch input;
    in the step of evaluating the touch validity of the first touch input, wherein it is considered if the first touch input satisfies a first predetermined requirement for the high-speed fine scan.

2. The method of claim 1, in the step of sensing the second touch input during the fine scan, wherein it is considered if the second touch input satisfies a second predetermined requirement for the fine scan.

3. The method of claim 1, wherein the first predetermined requirement is defined by at least one of a touch time, a repetition number, a touch pattern, and a touch code.

4. The method of claim 2, wherein the first predetermined requirement is defined by at least one of a touch time, a repetition number, a touch pattern, and a touch code.

5. The method of claim 2, wherein the second predetermined requirement includes one more condition if the second touch input is sensed in a predetermined time, after confirming that that the touch validity of the first touch input is satisfied.

6. The method of claim 1, after changing the display into the activation mode, further including a step of performing a normal scan, which scans the electrode pads with another frequency that is different from the frequency for the pre-scan.

7. The method of claim 6, wherein the frequency for the pre-scan is less than the frequency for the normal scan.

8. The method of claim 1, at the deactivation mode of the display, wherein the pre-scan restarts if no second touch input is sensed in a predetermined time during the fine scan.

9. The method of claim 1, wherein several neighbor electrode pads of the plurality of the electrode pads are grouped respectively to form a plurality of electrode groups.

10. The method of claim 9, wherein at least one of the pre-scan, the high-speed fine scan and the fine scan is performed by scanning the electrode groups, and
    wherein the electrode pads in the same electrode group work as one electrode.

11. The method of claim 9, wherein at least one of the pre-scan, the high-speed fine scan and the fine scan performs a group scan of scanning the electrode groups and an individual scan of scanning the electrode pads respectively, and
    the group scan and the individual scan are performed alternately.

12. The method of claim 11, wherein the individual scan is performed by a time period relatively longer than a time period of the group scan.

* * * * *